Mar. 13, 1923. 1,448,174
D. H. YOUNG
CENTRIFUGAL PUMP FOR DREDGING AND CONVEYING SOLIDS
Filed Mar. 15, 1918
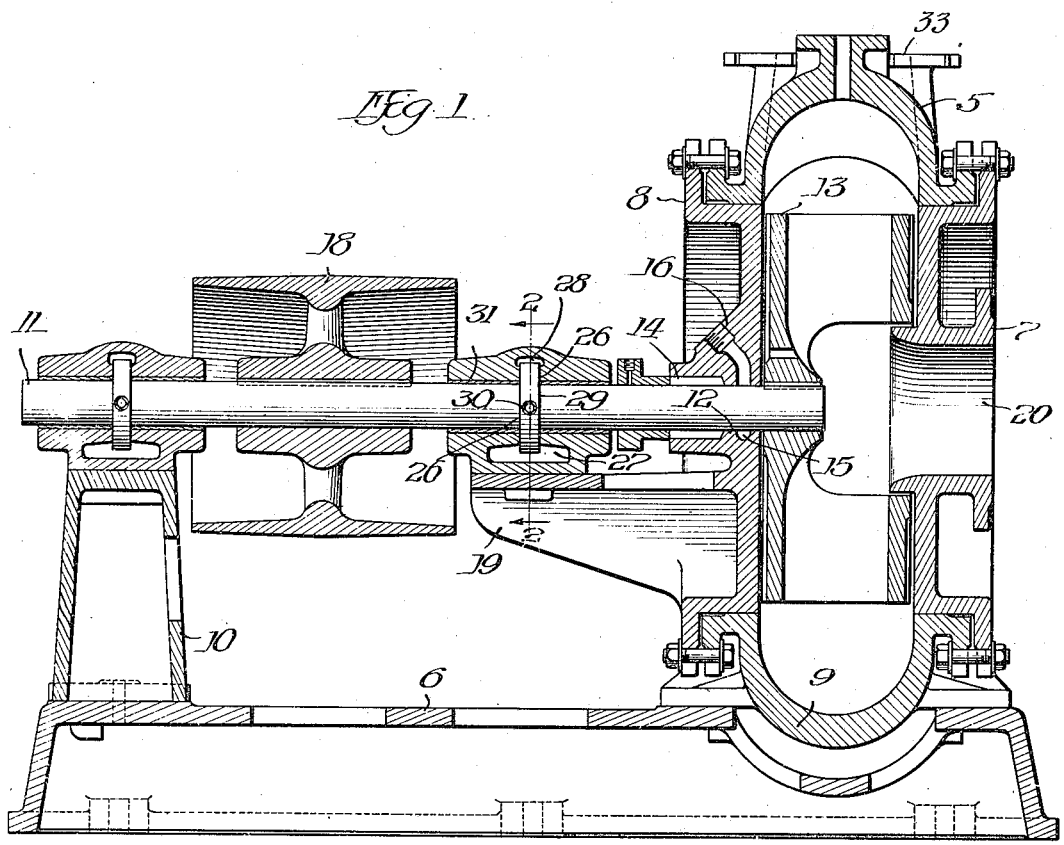
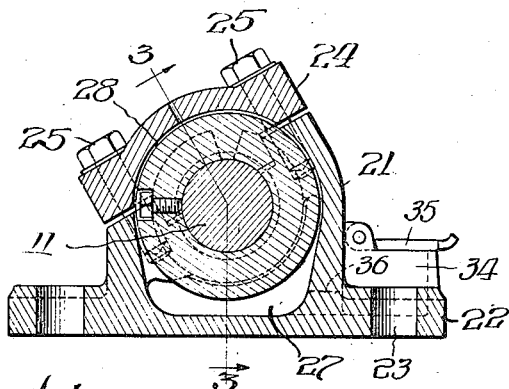
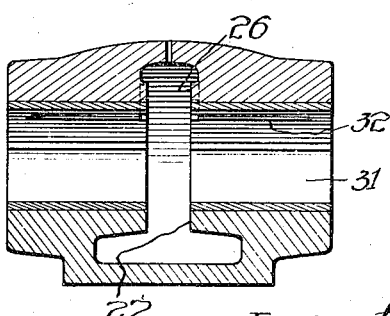
Inventor
Donald H. Young
By Wilkinson & Huxley
Attys Patented Mar. 13, 1923.

1,448,174

UNITED STATES PATENT OFFICE.

DONALD H. YOUNG, OF CHICAGO HEIGHTS, ILLINOIS, ASSIGNOR TO AMERICAN MANGANESE STEEL COMPANY, OF CHICAGO, ILLINOIS, A CORPORATION OF MAINE.

CENTRIFUGAL PUMP FOR DREDGING AND CONVEYING SOLIDS.

Application filed March 15, 1918. Serial No. 222,543.

*To all whom it may concern:*

Be it known that I, DONALD H. YOUNG, a citizen of the United States, residing at Chicago Heights, in the county of Cook and State of Illinois, have invented certain new and useful Improvements in a Centrifugal Pump for Dredging and Conveying Solids, of which the following is a specification.

My invention refers to centrifugal pumps and particularly to a single inlet pump for dredging and conveying solids such as sand and gravel.

One of the objects of my invention is to provide a side plate for a single inlet centrifugal pump, which side plate has means for preventing movement in the gland.

Another object is to provide a side plate for centrifugal pumps which has formed integrally therewith a support for a shaft bearing and which arm is independent of any other supporting means for properly maintaining the bearing in proper bearing relation with respect to the side plate.

Another object is to provide a side plate for a centrifugal pump which side plate has a shaft support for integral movement therewith.

A further object is to provide a construction of centrifugal pumps whereby all of the moving parts including the shaft, pulley and impeller may be moved from the pump shell without removing the pulley from the shaft.

A further object is to provide a self oiling bearing for impeller shafts for centrifugal pumps.

A still further object is to provide a thrust bearing support for use in connection with a centrifugal pump which support is formed integral with a side plate of the pump for preventing relative movement therebetween.

I accomplish these and other objects by providing a side plate for a single inlet centrifugal pump which plate has an extension or arm attached thereto preferably formed integrally therewith, for supporting a shaft bearing and on which arm a shaft bearing is fitted and serves as a support for the shaft at that point. The bearing which I prefer to use is so constructed as to furnish a support for the impeller shaft and also act against thrust collars fixed on the shaft, thus preventing axial movement of the shaft.

The above recited and other objects will be apparent from an inspection of the drawings, in which—

Figure 1 is a vertical sectional view through the preferred form of my invention.

Figure 2 is a section on line 2 of Figure 1 through the thrust bearing, and

Figure 3 is an enlarged longitudinal sectional view through the shaft bearing showing means for lubricating the bushings therein.

One of the objections to the present arrangement of single inlet centrifugal pumps is that because of the lateral movement of the shaft the gland surrounding the shaft in the side plate has to be compressed so tightly to prevent leakage that heat is created by friction of the shaft, which heat is often so great as to cause over-heating, resulting in the total or partial destruction of the gland packing. Also the lateral movement of the shaft tends to create relative movement between the gland and the inner shaft bearing which movement unduly creates friction and is a source of great annoyance and an objection to the efficient operation of the pump. Continued relative movement between the shaft and gland soon permits leakage and allows sand to escape, which in time will damage the shaft and gland, making replacement necessary and preventing economical and efficient operation of the pump. Furthermore, shocks incidental to the operation of pumps used for dredging and conveying solids are overcome by the novel arrangement of my invention by provision of the shaft bearing support formed integrally with the side plate. As the packing gland is closed at the runner it is protected from sand by the close fit of the side plate around the shaft and further by the provision of a water seal. Whenever the shaft bearing adjacent the pump is moved relatively thereto by reason of the operation of the pump, the vibrations of the shaft bearing and the gland in the pump casing are independent and opposed. If allowed to continue the opposed vibration would create excessive strains and tend to alter the relative relation between the gland and the adjacent shaft bearing to such an extent as to impair the efficiency thereof and interfere with the mechanical operation of the pump.

To overcome these objections I have provided a side plate having formed integrally therewith an outstanding arm which has an outer portion therewith serving as a seat to support the shaft bearing. The bearing serves as a thrust bearing and also as a radial bearing and is constructed in such a manner as to be self lubricating by reason of the rotation of the thrust collar in a bath of oil, the oil bath being formed in the lower portion of the bearing and a novel peripheral recess being formed about the space for the thrust collar as to serve as splash ways for the oil. I also provide oil grooves in the bushing which grooves are fed from the peripheral recesses, above described, thus making the whole bearing a self oiled and self contained one. By constructing the shaft bearing support integral with the side plate I eliminate all relative movement between the inner shaft bearing and the gland, reducing the friction created in the gland by transferring all axial shocks imparted to the shaft to the thrust bearing directly and by furnishing a support for the impeller shaft which will move with the side plate and not relatively thereto.

Referring now to the drawings, the preferred form of my invention which I desire to describe, is a pulley driven pump, although I do not wish to limit my invention to a pulley driven pump as I am aware that direct connection might be made between a motor or the like and the pump, thus doing away with the pulley.

I prefer to mount the pump which is designated generally by the numeral 5 on a base 6, the pump comprising the side plate 7 on the suction side, and the side plate 8 on the engine side of the pump, the plates being bolted to a central shell portion 9 and, therewith securely fastened to the base 6. The side plates project into the opening of the runner so that no sand or gravel may drop between the plates and the runner. At the end of the base 6 there is mounted a bearing support 10 provided with a bearing for supporting the outer end of the shaft 11. As is usual the engine side plate 8 is provided with a central aperture 12 through which passes the shaft 11 on which the impeller or runner 13 is secured for rotation therewith. For preventing passage of water through the aperture 12, the usual gland or stuffing box 14 is furnished. In my construction the gland is placed close to the runner and is protected from sand by the close fit of the side plate 8 about the shaft 11 and the provision of the water seal 15. The entrance to the water seal 15 is controlled by suitably arranged opening 16 for connection with a supply of clear water. The shaft 11 is supported at its outer end by a bearing, and at a point nearer the pump 5 by another bearing. Between said bearings it is usual to mount the pulley 18 on the shaft 11 keyed or otherwise secured thereto for rotation of the shaft and the impeller. The bearings are shaft bearings as well as thrust bearings, that is, provision is made to support movement of the shaft both axially and in the direction of rotation, the provision of these means being more fully described hereinafter.

To prevent relative movement between the side plate 8 and the inner bearing, I prefer to cast integrally with said plate an outstanding arm 19 adapted to support the inner bearing. It will therefore be seen that relative movement between the inner thrust bearing and the side plate 8 is prevented as any movement imparted to the side plate by the shaft will be transmitted to the thrust bearing causing simultaneous movement of both parts eliminating therefore any tendency to leakage in the gland 14 because of the movement of the shaft in other direction than that of rotation.

The bearings which I have invented and of which two are shown, comprise lower portions 21 provided with the usual bases 22 for fastening to the bearing supports on the arm 19 and the support 10 which fastening may be made by bolts or similar means extending through the apertures 23 in the base portions 22. To facilitate application and removal of the shaft and renewal of the bushings, etc., I prefer to form the top portion 24 as separable from the lower portion 21, the top 24 being secured to the lower portion 21 by the usual bolts 25. Referring to Figure 2, it will be observed that the top and bottom portions 24 and 21 form the usual cooperative bearing members. In the preferred form, in each of these portions are vertically positioned slots or cavities 26, 27, arranged to extend vertically through each member 21, 24. The lower portion of the slot 26, that is the one in the member 21, is enlarged to form a chamber 27 for the reception of oil or similar lubricant and the peripheral portion of the slot 26 is enlarged forming the annular recess 28.

As a means for supplying oil to the chamber 27 I form an opening 34 closed by a hinged cap 35, the opening 34 being connected with the chamber 27 by means of a passageway 36 so that the chamber 27 may be kept full. The height of the opening 34 is made sufficient to maintain a suitable depth of oil within the chamber 27. To engage the vertically disposed slots 26 I prefer to employ collars 29 secured to the shaft 11 by screws 30, or other means, which collars extend well into the slots 26 and into the oil chamber 27, the width of the slots 26 being but slightly greater than the thickness of the collars 29. It will be observed that as the shaft 11 is rotated, the collars 29 are rotated therewith and it is to be noted that these collars rotate in oil baths in the chambers 27. Because of the rotation of the collars the oil is splashed, picked up, and carried around through the portion 28 forming an oil cushion around the collars 29, and forming a deposit of oil on the upper surface of the chamber 26. As a further means for lubricating the bearings I prefer to form within the collar portions of the bushings 31 longitudinally extending grooves 32 connected with the peripheral portion 28. This arrangement permits feeding oil to the longitudinal groove 32 by rotation of the collar 29 with the shaft 11, the collar 29 serving as a stop to prevent thrust of the shaft and also as a splasher to oil the bushing 31 and also the radially disposed slots in 26, the arrangement being to provide a radial and thrust bearing having a self-oiling arrangement.

In operation of the pump, material is drawn in through the opening 20 by means of the rotation of the impeller 13 and directed outwardly through the usual portion 33 of the pump. The axial movement of the shaft is induced by the unbalanced pressure within the pump which axial movement is offset by provision of the thrust bearing. By provision of the collars 29 on the shaft 11, end thrust of the shaft is resisted, the novel radial and thrust bearing of my invention eliminating much of the friction heretofore encountered by providing a novel bearing as well as an efficient lubricating means. Furthermore, it is possible under all conditions of service to keep the bearing well lubricated including the bushings supporting the shaft as well as the surfaces opposing bodily movement of the collars 29.

It will readily be observed that my invention will eliminate the relative movement heretofore experienced between the gland in the side plate and the bearing which prevents leakage through the gland 14 and setting up of friction especially in the inner bearing. Consequently any undue strain imposed on the pump will be transmitted to the side plate and to the inner bearing instead of to the side plate only. This tends to prolong the life of the bearing and shaft and also prevents a great amount of friction between the impeller shaft, bearing and gland.

I am aware that modifications of such a machine may be made and such modifications as come within the scope of the appended claims I consider as coming within the spirit of my invention.

I claim:—

1. In a centrifugal pump, in combination, a pump casing having runner opening, separate side plates projecting into the runner opening and flush with the inner surface of the pump casing, the engine side plate having a central aperture for the runner shaft and provided with a water seal about said shaft opening, said engine side plate also having an outwardly extending arm integral therewith for supporting a shaft bearing, and means for securing said side plates to said casing.

2. In a centrifugal pump, in combination, a pump casing, separate side plates for said casing, an impeller within said casing and rotating between said side plates, said plates projecting into the impeller opening and defining a space but slightly greater than the width of said impeller, the engine side plate having a central opening for the impeller shaft and provided with a water seal about said shaft opening and also with a gland member, an arm integral with said engine side plate extending outwardly therefrom with a bearing supported thereon, and means for securing said side plate to said casing.

Signed at Chicago Heights, State of Illinois, this 5th day of March, A. D., 1918.

DONALD H. YOUNG.